United States Patent
Hyun et al.

(10) Patent No.: US 10,645,134 B2
(45) Date of Patent: May 5, 2020

(54) PEER AND OPERATION METHOD THEREOF

(71) Applicant: Electronics and Telecommunications Research Institute, Daejeon (KR)

(72) Inventors: Wook Hyun, Daejeon (KR); Changkyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 143 days.

(21) Appl. No.: 16/010,673

(22) Filed: Jun. 18, 2018

(65) Prior Publication Data

US 2018/0367588 A1     Dec. 20, 2018

(30) Foreign Application Priority Data

Jun. 19, 2017   (KR) .......... 10-2017-0077338
Apr. 23, 2018   (KR) .......... 10-2018-0046637

(51) Int. Cl.
*H04L 29/06* (2006.01)
*H04L 29/08* (2006.01)

(52) U.S. Cl.
CPC ........ *H04L 65/4092* (2013.01); *H04L 65/601* (2013.01); *H04L 67/104* (2013.01); *H04L 67/1095* (2013.01)

(58) Field of Classification Search
CPC . H04L 65/4092; H04L 67/104; H04L 65/601; H04L 67/1095

USPC ........................................................ 709/219
See application file for complete search history.

(56) References Cited

U.S. PATENT DOCUMENTS

| | | | |
|---|---|---|---|
| 2010/0138494 A1 | 6/2010 | Lee et al. | |
| 2012/0159267 A1* | 6/2012 | Gyorffy | G06F 11/0709 714/55 |
| 2013/0067116 A1 | 3/2013 | Ostergren | |
| 2013/0083034 A1* | 4/2013 | Mandal | G06T 13/00 345/473 |
| 2013/0290557 A1* | 10/2013 | Baratz | H04L 65/60 709/231 |
| 2016/0099987 A1 | 4/2016 | Shamma | |
| 2016/0197731 A1 | 7/2016 | Hyun et al. | |

FOREIGN PATENT DOCUMENTS

KR    10-1231208    2/2013

* cited by examiner

*Primary Examiner* — Tu T Nguyen
(74) *Attorney, Agent, or Firm* — Kile Park Reed & Houtteman PLLC

(57) ABSTRACT

Disclosed is a peer and an operation method of the peer, the method including receiving, from a partner peer, buffermap timetable (BTT) information associated with a buffermap of the partner peer, verifying whether a difference value between a forced delay and time information of the peer corresponds to the BTT information, requesting, when the difference value corresponds to the BTT information, a fragment of a fragment number corresponding to the difference value from the partner peer, and deriving, when the difference value does not correspond to the BTT information, the fragment number based on the BTT information.

14 Claims, 10 Drawing Sheets

PEER AND OPERATION METHOD THEREOF

CROSS-REFERENCE TO RELATED APPLICATION(S)

This application claims the priority benefit of Korean Patent Application No. 10-2017-0077338 filed on Jun. 19, 2017 and Korean Patent Application No. 10-2018-0046637 filed on Apr. 23, 2018, in the Korean Intellectual Property Office, the disclosures of which are incorporated herein by reference for all purposes.

BACKGROUND

1. Field

One or more example embodiments relate to a peer.

2. Description of Related Art

Unlike a server-client method, in terms of a peer-to-peer (P2P)-based distributed streaming, playback synchronization is difficult due to various factors, for example, different buffermaps of peers. Accordingly, there is a desire for technology for the playback synchronization.

SUMMARY

According to an aspect, there is provided an operation method of a peer, the method including receiving, from a partner peer, buffermap timetable (BTT) information associated with a buffermap of the partner peer, verifying whether a difference value between a forced delay and time information of the peer corresponds to the BTT information, requesting, when the difference value corresponds to the BTT information, a fragment of a fragment number corresponding to the difference value from the partner peer, and deriving, when the difference value does not correspond to the BTT information, the fragment number based on the BTT information.

The BTT information may include fragmentation time information respectively corresponding to fragments in a time span set by the peer.

The deriving of the fragment number may include deriving the fragment number based on an average of deviations of the fragmentation time information.

The fragmentation time information may respectively indicate generation times of the fragments.

The operation method may further include requesting, when the fragment number is derived, the partner peer to receive a fragment corresponding to the derived fragment number.

The receiving of the BTT information may include transmitting a HELLO message or a GETBTT message to the partner peer and receiving, as a response to the HELLO message or the GETBTT message, a HELLO message including the BTT information or a BTT message including the BTT information from the partner peer.

The HELLO message may correspond to a message used by the peer to establish a neighbourship with the partner peer.

The GETBTT message may correspond to a message used by the peer to request the BTT information from the partner peer.

The HELLO message and the GETBTT message of the peer may include information associated with a time span set by the peer.

The forced delay may be selected by a service provider or the peer.

According to another aspect, there is also provided a peer including a communication interface and a processor configured to receive BTT information associated with a buffermap of a partner peer from a partner peer through the communication interface, verify whether a difference value between a forced delay and time information of the peer corresponds to the BTT information, request, when the difference value corresponds to the BTT information, a fragment of a fragment number corresponding to the difference value from the partner peer, and derive, when the difference value does not correspond to the BTT information, the fragment number based on the BTT information.

The BTT information may include fragmentation time information respectively corresponding to fragments in a time span set by the peer.

The processor may be configured to derive the fragment number based on an average of deviations of the fragmentation time information.

The fragmentation time information may respectively indicate generation times of the fragments.

When the fragment number is derived, the processor may be configured to request the partner peer to receive a fragment corresponding to the derived fragment number.

The processor may be configured to transmit a HELLO message or a GETBTT message to the partner peer, and receive, as a response to the HELLO message or the GETBTT message, a HELLO message including the BTT information or a BTT message including the BTT information from the partner peer.

The HELLO message may correspond to a message used by the peer to establish a neighbourship with the partner peer.

The GETBTT message may correspond to a message used by the peer to request the BTT information from the partner peer.

The HELLO message and the GETBTT message of the peer may include information associated with a time span set by the peer.

The forced delay may be selected by a service provider or the peer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
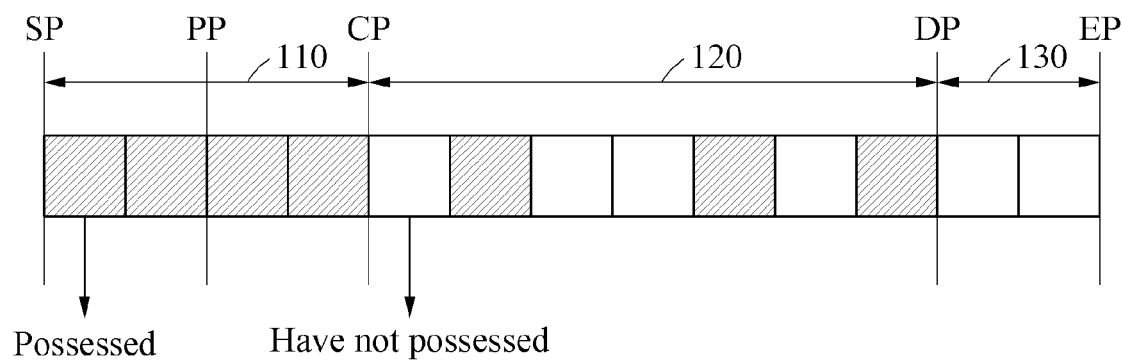
FIG. 1 is a diagram illustrating a buffermap according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a buffermap according to an example embodiment.

FIG. 1 illustrates a buffermap 100 of a peer.

The buffermap 100 may include a completed section 110, a downloading section 120, and an empty section 130.

The completed section 110 may be a section that a peer possesses fragments continuously.

The downloading section 120 may be a section that a peer does not possess fragments continuously.

The empty section 130 may be a section to be used for buffering to prevent a downloading point (DP) from overriding a starting point (SP).

The buffermap 100 may have the following attributes that indicate specific fragment identifiers.

A completed point (CP) may indicate an end of the completed section 110 in the buffermap 100. In other words, the CP may correspond to the end of the completed section 110.

A DP may indicate an end of the downloading section 120 in the buffermap 100. In other words, the DP may correspond to the end of the downloading section 120.

An SP may indicate an identifier at the beginning of the buffermap 100. In other words, the SP may indicate a start of the buffermap 100.

A play point (PP) may indicate an identifier passed to a player in the buffermap 100. The PP may be used for flow control with other peers.

An end point (EP) may indicate an end of the empty section 130.

Figure 2:
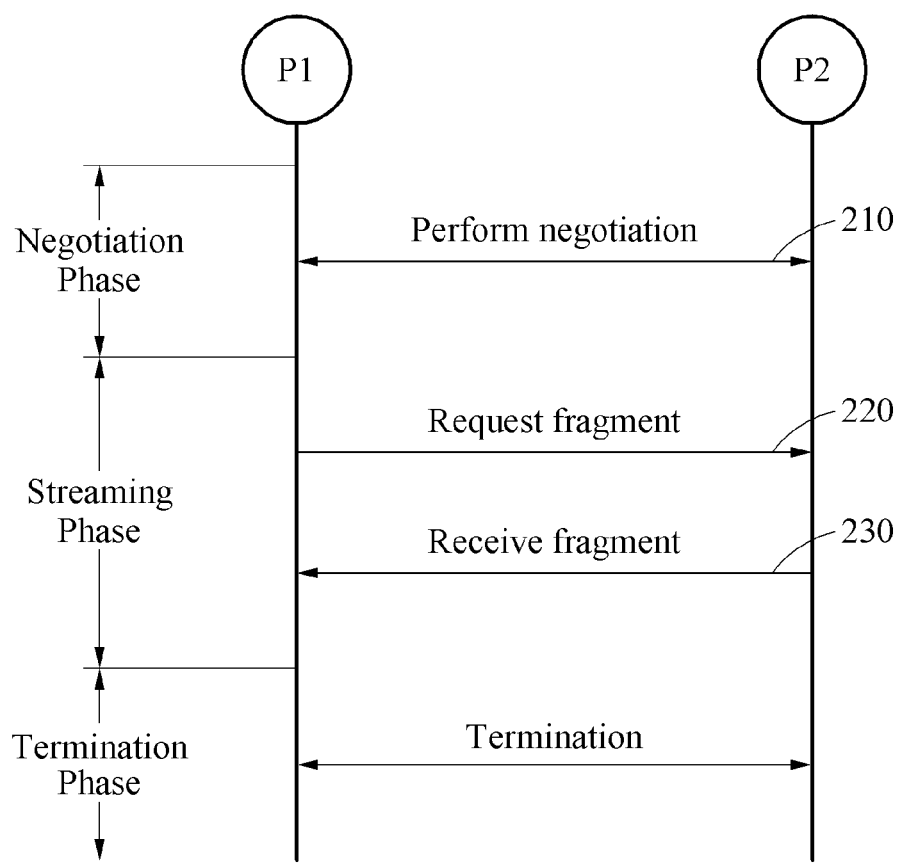
FIG. 2 is a flowchart illustrating communication of peers according to an example embodiment.

FIG. 2 is a flowchart illustrating communication of peers according to an example embodiment.

Referring to FIG. 2, communication of peers or a protocol of the peers may include a negotiation phase, a streaming phase, and a termination phase.

In operation 210, a peer P1 may perform a negotiation with a peer P2 in the negotiation phase. In the negotiation phase, the peer P1 may exchange a buffermap with the peer P2. Also, in the negotiation phase, the peer P1 may receive at least one of information on the buffermap of the peer P2 and buffermap timetable (BTT) information of the peer P2 from the peer P2. The information on the buffermap of the peer P2 may include an SP value and a DP value of the buffermap of the peer P2. Likewise, in operation 210, the peer P2 may receive at least one of information on a buffermap of the peer P1 and BTT information of the peer P1 from the peer P1. The information on the buffermap of the peer P1 may include an SP value and a DP value of the buffermap of the peer P1.

In the streaming phase, the peer P1 may request a fragment from the peer P2 in operation 220 and receive the fragment from the peer P2 in operation 230.

In the termination phase, the peer P1 may terminate the communication with the peer P2. The peer P1 may send a termination request to the peer P2 to release a resource of the peer P1.

For example, immediately after the peer P1 is initiated, the BTT information of the peer P2 may be absent. In this example, the peer P1 may determine an initial SP value of the peer P1 based on the SP value and the DP value of the peer P2 in the negotiation phase. Related description will be provided with reference to FIG. 3.

Figure 3:
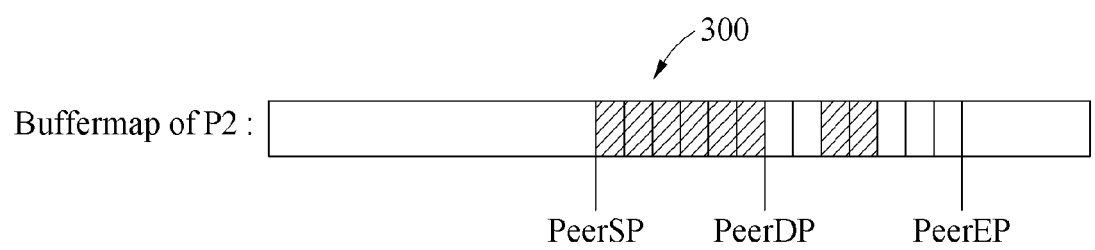
FIG. 3 is a diagram illustrating a peer determining a starting point value of a buffermap when buffermap timetable (BTT) information of a partner peer is absent according to an example embodiment.

FIG. 3 is a diagram illustrating a peer determining a starting point value of a buffermap when BTT information of a partner peer is absent according to an example embodiment.

FIG. 3 illustrates a buffermap 300 of a peer 2 corresponding to a partner peer of a peer 1.

Referring to FIG. 3, peerSP denotes an SP value of the buffermap 300, peerDP denotes a DP value of the buffermap 300, and peerEP denotes an EP value of the buffermap 300.

Immediately after the peer P1 is initiated, BTT information of a peer P2 may be absent. In this example, as described above, a peer P1 may determine an initial SP value of the peer P1 based on an SP value and a DP value of the peer P2. The peer P1 may determine the initial SP value of the peer P1 using Equation 1.

$$SP = peerDP - ROUND[\tfrac{1}{2} \times \max\{(peerDP - peerSP), 1\}] \quad \text{[Equation 1]}$$

In Equation 1, max denotes an operator that selects a greater value between "1" and a difference value between peerDP and peerSP, and ROUND denotes a round-off operator.

When the difference value between peerDP and peerSP is less than "1", a difference value between peerDP and ROUND[½×1], that is, peerDP−1 may be determined to be the initial SP value of the peer P1.

Referring to FIG. 2, in operation 210, the peer P1 may transmit a HELLO message to the peer P2 to request information on a buffermap of the peer P2 and the BTT information of the peer P2 from the peer P2. Likewise, in operation 210, the peer P2 may transmit a HELLO message to the peer P1 to request information on a buffermap of the peer P1 and BTT information of the peer P1 from the peer P1. The HELLO message will be further described with reference to FIG. 4.

Figure 4:
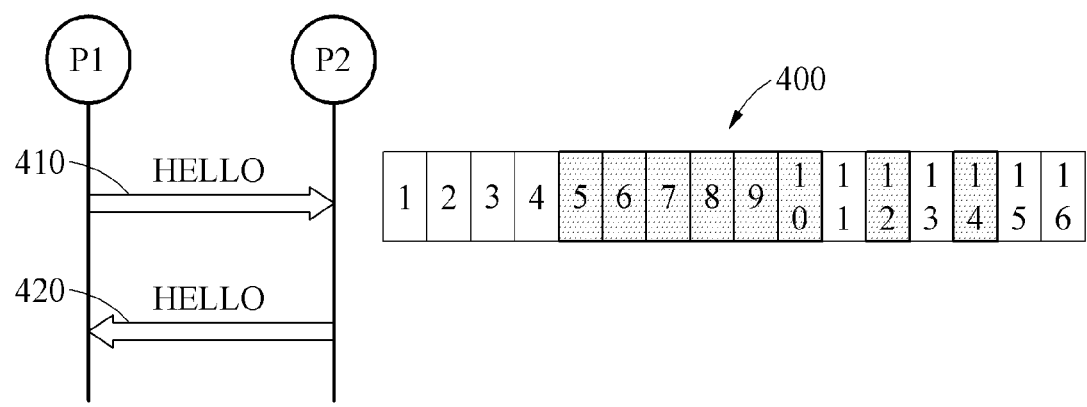
FIG. 4 is a diagram illustrating a HELLO message according to an example embodiment.

FIG. 4 is a diagram illustrating a HELLO message according to an example embodiment.

A HELLO message is described prior to the description of FIG. 4. The HELLO message may be a message used by a peer for establishing a neighbourship with a partner peer. Table 1 represents an example of syntax of the HELLO message.

TABLE 1

```
{
    "method":"HELLO",
    "proto-version":integer,
    "peer-id":string,
    "overlay-id":string,
    "valid-time":integer,
    "sp-index":integer,
    "cp-length":integer,
    "dp-index":integer,
    "ds-length":integer,
    "buffermap":binary
    "req-btt";boolean,
    "req-btt-span": {
        "start" : integer,
        "end" : integer
    },
    "btt" : [ { "piece-id" : integer, "timestamp" : integer }, ... ]
}
``` peer-id denotes an identifier of a peer.
overlay-id denotes an identifier of an overlay network.
valid-time denotes a valid time of a buffermap.
sp-index denotes a starting index number of a fragment represented by the buffermap. sp-index may correspond to an SP value described above.

cp-length denotes a length of a completed section in a buffermap beginning at sp-index.

dp-index denotes an index number of a downloading section. dp-index may correspond to a DP value described above.

ds-length denotes a length of the downloading section.

buffermap represents a possession status of fragments in the downloading section. When the peer possesses a particular fragment, the peer may set "1" for buffermap. Otherwise, the peer set "0" for buffermap.

req-btt represents whether the peer is to receive a buffermap timetable.

req-btt-span is used when the peer requests a buffermap corresponding to a specific time zone. When a value of req-btt is "true" and req-btt-span is absent, the partner peer may transmit a buffermap timetable of the entire buffermap of the partner peer to the peer. When the peer is to have a buffermap timetable following a certain time, an end parameter may not be included in the HELLO message.

When the peer receives a HELLO message in which req-btt is "true" and transmits a HELLO message of the peer, btt may be used to incorporate a buffermap timetable of the peer into the HELLO of the peer. In btt, piece-id represents an identifier of a fragment and timestamp represents a fragmentation time of the fragment or a generation time of the fragment.

Referring to FIG. 4, in operation 410, a peer 1 may transmit a HELLO message to a peer 2. Here, the HELLO message of the peer 1 may be based on the syntax of Table 1. The HELLO of the peer 1 may include, for example, any one or any combination of an identifier of the peer 1, an identifier of an overlay network in which the peer 1 participates in, a valid time of a buffermap of the peer 1, an SP value of the buffermap of the peer 1, a length of a completed section in the buffermap of the peer 1, a DP value of the buffermap of the peer 1, a length of a downloading section in the buffermap of the peer 1, whether the peer 1 possesses fragments in the downloading section, and whether the peer 1 is to receive BTT information of the peer 2. When the peer 1 is to have a buffermap corresponding to a predetermined time span, a time value corresponding to a start of the time span may be set in a start parameter in req-btt-span and a time value corresponding to an end of the time span may be set in an end parameter in req-btt-span. For example, when the peer 1 is to have a buffermap between a time value "300022" of an NTP timestamp format and a time value "350000" of the NTP timestamp format, the peer 1 may set req-btt-span as shown in Table 2. Also, when the peer 1 is to have BTT information associated with fragments between the time value "300022" and the time value "350000", the peer 1 may set req-btt-span as shown in Table 2.

TABLE 2

```
"req-btt-timespan" : {
    "start" : 300022,
    "end" : 350000
}
```

In operation 420, as a response to the HELLO message, the peer 2 may transmit a HELLO message to the peer 1. In this example, the HELLO message of the peer 2 may be based on the syntax of Table 1. The HELLO message of the peer 2 may include, for example, any one or any combination of an identifier of the peer 2, an identifier of an overlay network in which the peer 2 participates in, a valid time of a buffermap of the peer 2, an SP value of the buffermap of the peer 2, a length of a completed section in the buffermap of the peer 2, a DP value of the buffermap of the peer 2, a length of a downloading section in the buffermap of the peer 2, whether the peer 2 possesses fragments in the downloading section, and whether the peer 2 is to receive BTT information of the peer 1.

When the peer 1 is to receive the BTT information of the peer 2, the HELLO message of the peer 2 may include btt of the above-mentioned syntax. In an example, when a value of req-btt is "true" and req-btt-span is absent in the HELLO message of the peer 1, the peer 2 may incorporate identifiers of all fragments in the buffermap of the peer 2 and fragmentation times of the fragments into the HELLO message of the peer 2. In another example, when a value of req-btt is "true" and a start parameter in req-btt-span is "303000" in the HELLO message of the peer 1, the peer 2 may incorporate identifiers of fragments after "303000" among all fragments in the buffermap of the peer 2 and fragmentation times of the fragments into the HELLO message of the peer 2. In still another example, when a value of req-btt is "true," a start parameter in req-btt-span is "a," and an end parameter in req-btt-span is "b," the peer 2 may incorporate identifiers of fragments between "a" and "b" (for example, fragments generated between "a" and "b") among all fragments in the buffermap of the peer 2 and fragmentation times of the fragments into the HELLO message of the peer 2. Table 3 represents an example of btt, that is BTT information.

TABLE 3

"btt" : [
{ "piece-id" : 8,
 "timestamp" : 3015831 },
{ "piece-id" : 9,
 "timestamp" : 3015931 },
{ "piece-id" : 10,
 "timestamp" : 3016231 },
]

The peer 1 may determine the SP value of the peer 1 based on the BTT information of the peer 2. Related description will be provided with reference to FIG. 5.

Figure 5:
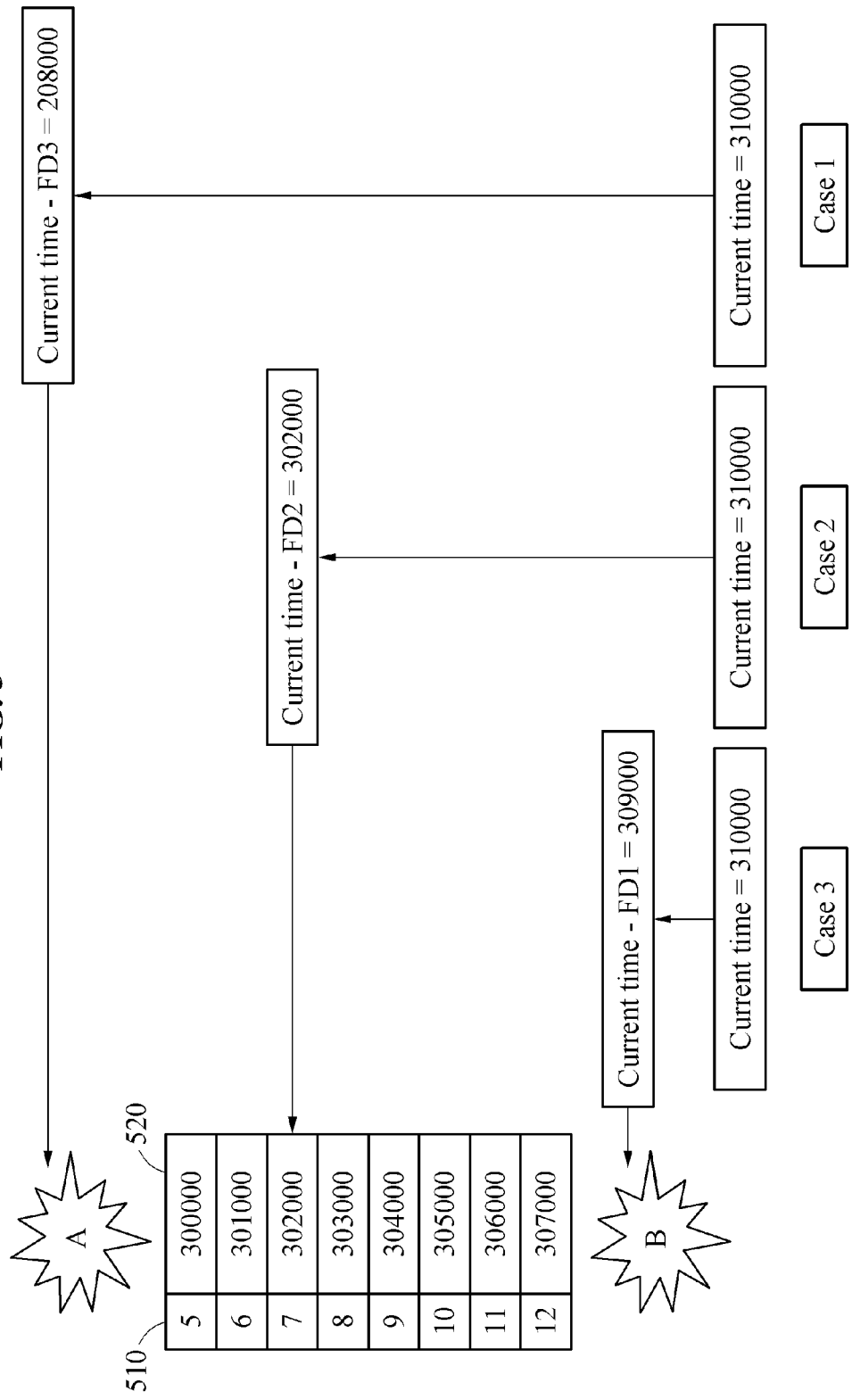
FIG. 5 is a diagram illustrating a peer determining a starting point value of a buffermap based on BTT information of a partner peer according to an example embodiment.

FIG. 5 is a diagram illustrating a peer determining a starting point value of a buffermap based on BTT information of a partner peer according to an example embodiment.

FIG. 5 illustrates BTT information including fragment number 510 or a fragment identifier of each fragment corresponding to a time span set by a peer P1 and fragmentation time information 520. The fragment number 510 may be a number corresponding to an index number of a fragment or a number to be derived from an identifier of the fragment.

The peer P1 may acquire time information. The time information may be, for example, an NTP timestamp format.

The peer P1 may search BTT information of a peer P2 for a difference value between the time information and a forced delay (FD), that is, a fragment number or a fragment identifier corresponding to "time information-forced delay." In this example, a value or a magnitude of the forced delay may be selected or determined by a service provider or the peer P1. As illustrated in Case 1 and 3 of FIG. 5, the fragment number or the fragment identifier corresponding to "time information-forced delay" may be absent in the BTT information of the peer P2.

<Case 1>

When the FD is relatively large, when a buffermap of the peer P2 is relatively small, or when a desired section of the peer P1 has passed "time information—forced delay" in the buffermap of the peer P2, the peer P1 may not find the fragment number or the fragment identifier corresponding to "time information—forced delay" from the BTT information of the peer P2. In this case, the peer P1 may infer the fragment number or the fragment identifier corresponding to "time information—forced delay." For example, the peer P1 may infer the fragment number or the fragment identifier corresponding to "time information—forced delay" using an average of deviations of timestamps 520. The peer P1 may determine the inferred fragment number to be the SP value of the peer P1. Since a fragment to be received from the peer P2 is absent, the peer P1 may terminate a connection with the peer P2 and connect to another peer.

<Case 3>

When the FD is relatively small or when the peer P2 does not possess latest fragments, the peer P1 may not find the fragment number or the fragment identifier corresponding to "time information—forced delay" from the BTT information of the peer P2. In this case, the peer P1 may derive the fragment number or the fragment identifier corresponding to "time information—forced delay." For example, the peer P1 may infer the fragment number or the fragment identifier corresponding to "time information—forced delay" using an average of deviations of the timestamps 520. Also, the peer P1 may request fragments received by a currently connected peer. Also, the peer P1 may connect to other peers to fill the buffermap of the peer P1.

<Case 2>

As in Case 2, the fragment number or the fragment identifier corresponding to "time information—forced delay" may be present in the BTT information of the peer P2. In the example of FIG. 5, the peer P1 may find a fragment number 7 corresponding to "time information—forced delay" from the BTT information of the peer P2. In this case, the peer P1 may determine the fragment number 7 to be the SP value of the peer P1. The peer P1 may request a fragment corresponding to the fragment number 7. Related description will be provided with reference to FIG. 6.

Figure 6:
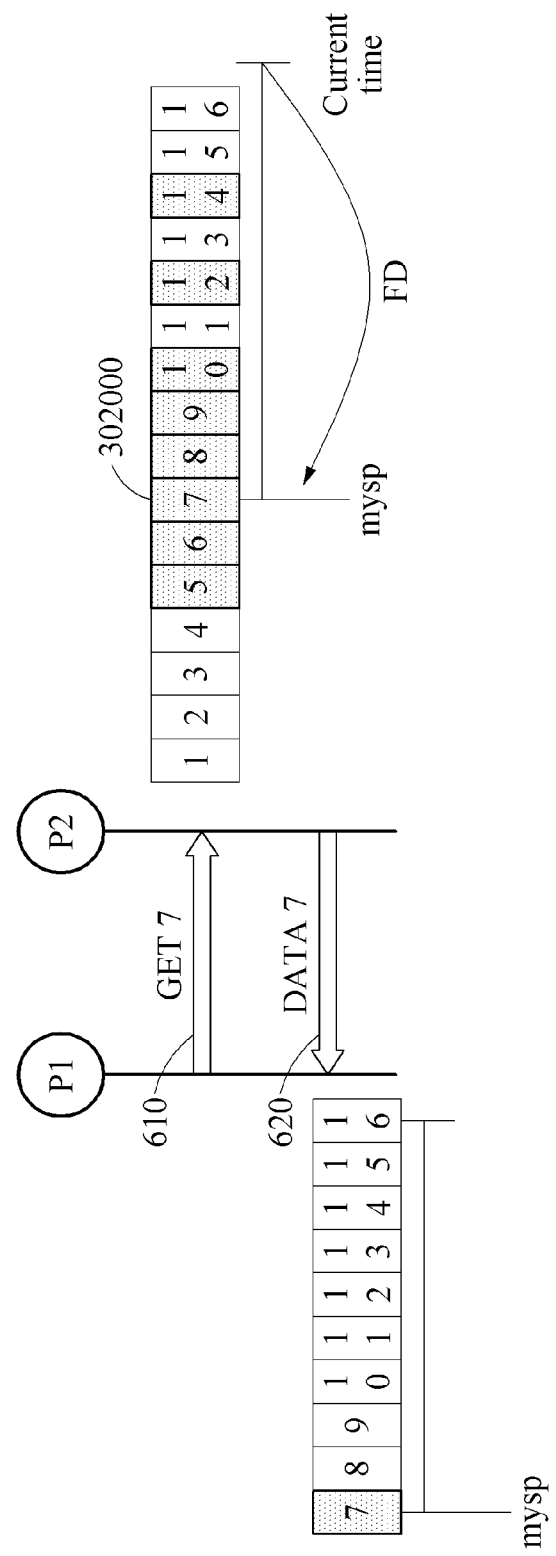
FIG. 6 is a diagram illustrating a peer requesting a fragment and receiving the fragment according to an example embodiment.

FIG. 6 is a diagram illustrating a peer requesting a fragment and receiving the fragment according to an example embodiment.

Referring to FIG. 6, in operation 610, a peer P1 may transmit a GET message to the peer P2. For example, in operation 610, the peer P1 may request a fragment from the peer P2. The GET message may include an index number or a fragment number of the fragment requested by the peer P1.

In operation 620, the peer P2 may transmit a data message to the peer P1. The data message may include, for example, the fragment requested by the peer P1, the index number of the fragment number of the fragment, a size of the fragment, and a generation time information of the fragment.

Figure 7:
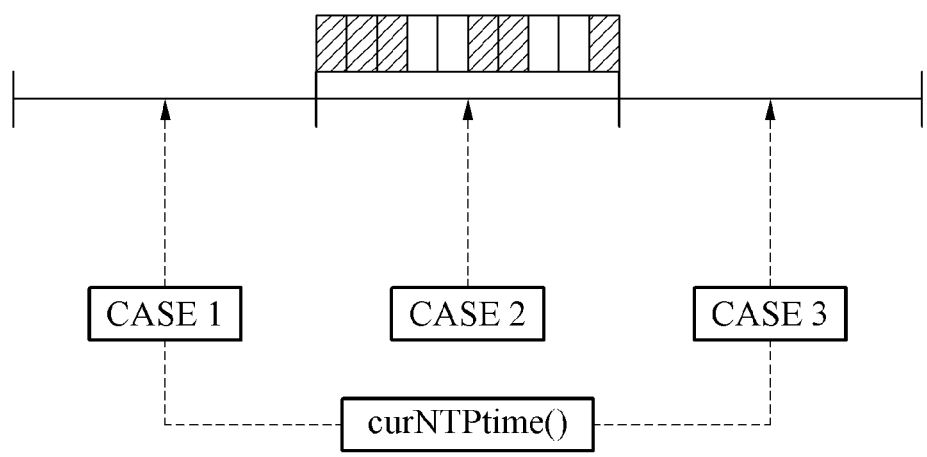
FIG. 7 is a diagram illustrating a peer determining a starting point value of a buffermap based on BTT information of a partner peer according to an example embodiment.

FIG. 7 is a diagram illustrating a peer determining a starting point value of a buffermap based on BTT information of a partner peer according to an example embodiment.

Referring to FIG. 7, a peer may correspond to a peer P1 and a partner peer may correspond to a peer P2.

When it comes to provide synchronized distribution, it uses timetable information that is exchanged during the buffermap negotiation. Since a source peer embeds an NTP timestamp into the DATA message on creation of the piece, it is possible to calculate the approximate presentation timing. Furthermore, it is also capable of calculating the corresponding peer's buffermap timetable using the HELLO or GETBTT messages. However, unlike the server-client streaming model, P2P-based streaming has some limitations in providing hard real-time streaming. Therefore, a forced delay (FD) needs to be provided and this delay will be chosen by the service provider or the peer. If a peer has BTT information of the first contacted corresponding peer, the initial SP value is calculated according to one of the three cases that can happen on initializing the SP for synchronization among multiple peers.

Case 1: when a buffermap of the partner peer has passed an SP value of the peer, an initial SP value may be selected using an average of time deviations of fragmentation times included in the BTT information of the partner peer and a fragment number corresponding to "curNTPtime( )–FD" may be inferred. "curNTPtime( )" denotes time information of an NTP timestamp format. For example, when a desired section of the peer has passed "curNTPtime( )–FD" in a buffermap of the partner peer, the peer may infer a fragment number corresponding to "curNTPtime( )–FD" using at least one of an average of time deviations of fragmentation times included in the BTT information and "curNTPtime( )–FD."

In Case 1, since data to be received from the partner peer is absent, the peer may terminate a connection with the partner peer and connect to another peer to receive data. Since the description of FIG. 5 is also applicable here, repeated description of Case 1 will be omitted.

Case 2: if there is a fragment selected as the SP value of this peer, it starts with the request fragment starting with this SP value. For example, the peer may verify whether a fragment having the same fragment time information as "curNTPtime( )−FD" is present in the buffermap of the partner peer based on the BTT information of the partner peer. When the fragment is present, the peer may determine a fragment number of the fragment, that is, a fragment number corresponding to curNTPtime( )−FD" to be the SP value of the peer and request a fragment corresponding to the SP value from the partner peer. Since the description of FIG. 5 is also applicable here, repeated description of Case 2 will be omitted.

Case 3: the peer may use an average of time deviations of fragmentation times included in the BTT information of the partner peer to derive a fragment number corresponding to "curNTPtime( )−FD" and request fragments received by a currently connected peer. The peer may set the derived fragment number to be the SP value of the peer. Because the partner peer does not possess a fragment corresponding to the SP value, the peer may request the partner peer to receive the fragment from other peers. Also, the peer may connect to other peers to fill the buffermap of the peer. Since the description of FIG. 5 is also applicable here, repeated description of Case 3 will be omitted.

Figure 8:
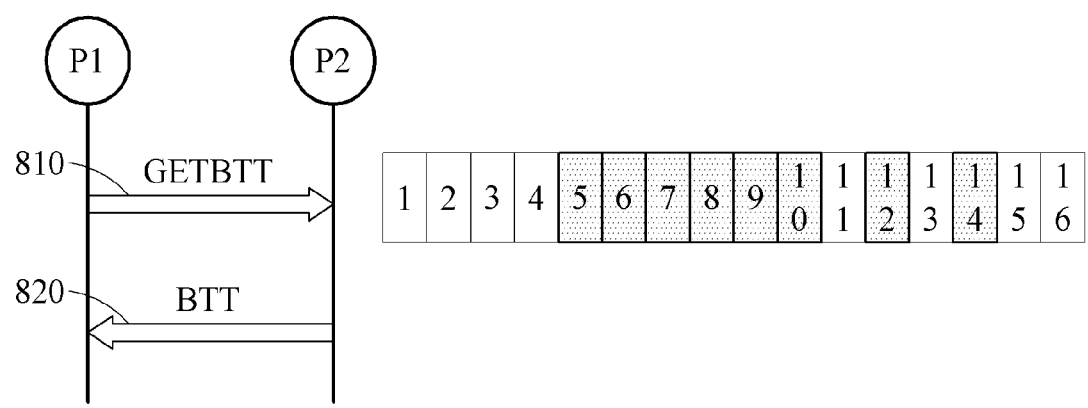
FIG. 8 is a diagram illustrating a GETBTT message and a BTT message according to an example embodiment.

FIG. 8 is a diagram illustrating a GETBTT message and a BTT message according to an example embodiment.

A GETBTT message and a BTT message will be described prior to the description of FIG. 8.

The GETBTT message may be used to request BTT information of a partner peer separately. Table 4 represents an example of syntax of the GETBTT message.

TABLE 4

{
  "method":"GETBTT",
  "overlay-id":string,
  "req-btt-span": {
    "start": integer,
    "end": integer,
  }
}

Since overlay-id, req-btt, and req-btt-span are described above and thus, repeated description will be omitted.

When the partner peer receives the GETBTT message, a BTT message may be used to provide BTT information to the peer in response to a request for the BTT information. Table 5 represents an example of syntax of the BTT message.

TABLE 5

{
  "method":"BTT",
  "peer-id":string,
  "overlay-id":string,
  "btt" : [ { "piece-id" : integer, "timestamp" : integer }, ... ]
}

Since overlay-id, peer-id, and btt are described above, repeated description will be omitted.

Referring to FIG. 8, in operation 810, the peer P1 may transmit a GETBTT message to the peer P2. The GETBTT message may be based on the syntax of Table 4.

In operation 820, the peer P2 may transmit a BTT message to the peer P1. The BTT message may be based on the syntax of FIG. 5.

As described with reference to FIG. 2, communication between the peer P1 and the peer P2 may include a negotiation phase and a streaming phase. As described with reference to FIG. 4, a HELLO message may be used in the negotiation phase and the GETBTT message and the BTT message may be used in the streaming phase. The peer P1 may request the BTT information of the peer P2 from the peer P2 using the GETBTT message in the streaming phase. The peer P2 may transmit the BTT information of the peer P2 to the peer P1 using the BTT message in the streaming phase.

Figure 9:
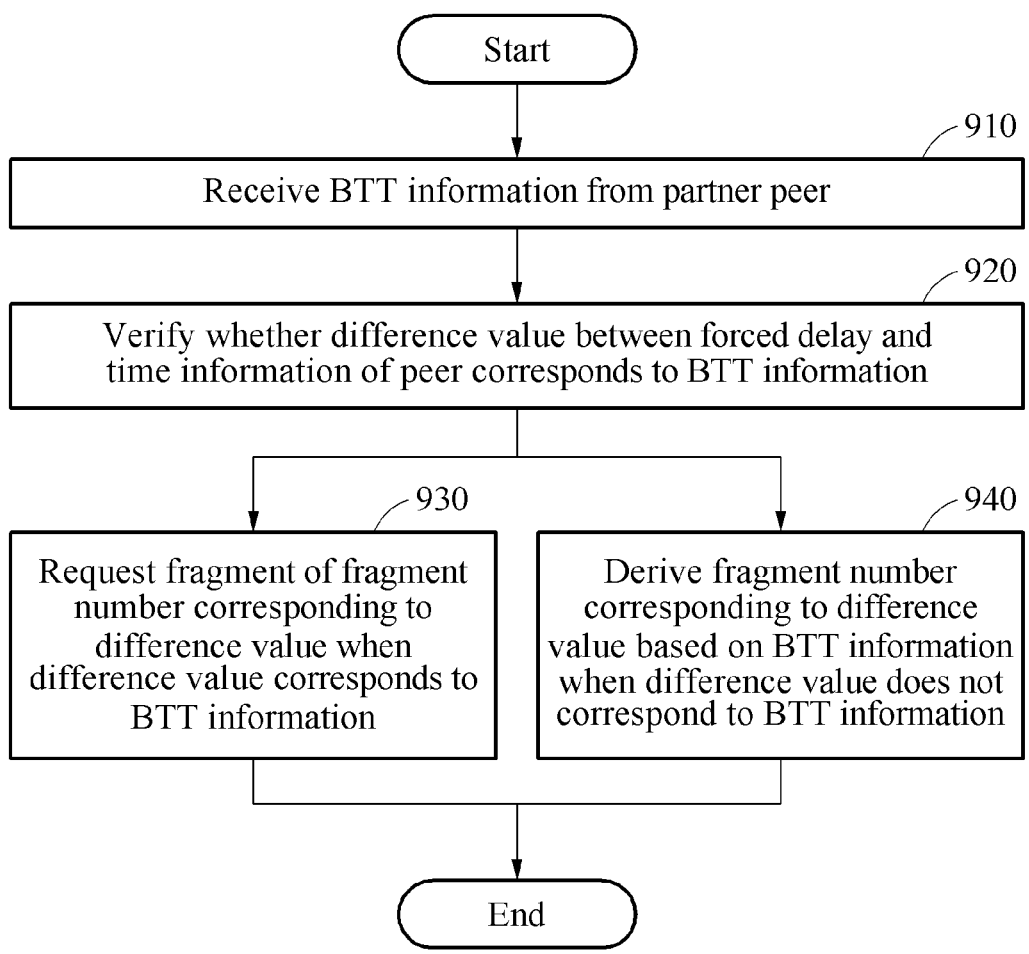
FIG. 9 is a flowchart illustrating an operation method of a peer according to an example embodiment.

FIG. 9 is a flowchart illustrating an operation method of a peer according to an example embodiment.

A peer and a partner peer of FIG. 9 may respectively correspond to the peer P1 and the peer P2 described above.

Referring to FIG. 9, in operation 910, the peer may receive BTT information associated with a buffermap of the partner peer from the partner peer. The BTT information may include fragmentation time information respectively corresponding to fragments in a time span set or desired by the peer.

In operation 920, the peer may verify whether a difference value between a forced delay and time information of the peer corresponds to the BTT information. For example, the peer may verify whether the BTT information includes fragment time information equal to the difference value.

In operation 930, the peer may request a fragment of a fragment number corresponding to the difference value from the partner peer when the difference value corresponds to the BTT information. Operation 930 may correspond to Case 2 described with reference to FIG. 5 or 7.

In operation 940, the peer may derive the fragment number corresponding to the difference value based on the BTT information when the difference value does not correspond to the BTT information. The peer may determine the derived fragment number to be an SP value of the peer. Operation 940 may correspond to Case 3 described with reference to FIG. 5 or 7.

Since the description of FIGS. 1 through 8 is also applicable here, repeated description of FIG. 9 will be omitted.

Figure 10:
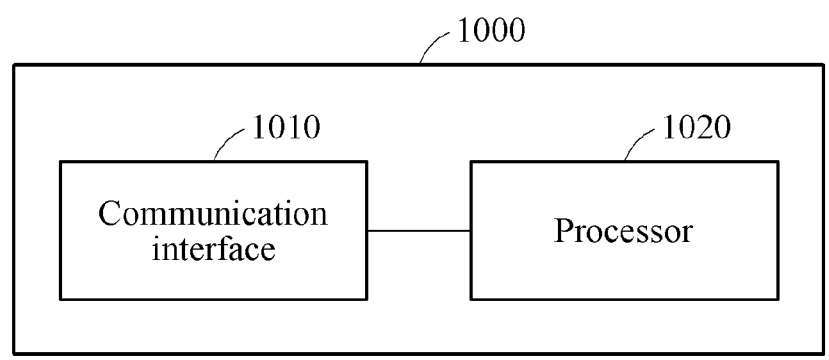
FIG. 10 is a block diagram illustrating a peer according to an example embodiment.

FIG. 10 is a block diagram illustrating a peer according to an example embodiment.

Referring to FIG. 10. a peer 1000 may include a communication interface 1010 and a processor 1020.

The processor 1020 may receive BTT information associated with a buffermap of a partner peer from a partner peer through the communication interface 1010.

The processor 1020 may verify whether a difference value between a forced delay and time information of the peer 1000 corresponds to the BTT information.

When the difference value corresponds to the BTT information, the processor 1020 may request a fragment of a fragment number corresponding to the difference value from the partner peer.

When the difference value does not correspond to the BTT information, the processor 1020 may derive the fragment number based on the BTT information.

Since the description of FIGS. 1 through 9 is also applicable here, repeated description of FIG. 10 will be omitted.

According to an aspect, it is possible to implement transmission synchronization or playback synchronization between peers.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operation method of a peer, the method comprising:
contacting with a corresponding peer; and
determining an initial starting point (SP) value of the peer if the peer has buffermap timetable (BTT) of the corresponding peer, the SP indicating an identifier at beginning of a buffermap of the peer,
wherein, in the determining, the initial SP value is chosen by using an average of time deviations of fragmentation time included in the BTT, and
wherein a fragment number corresponding to a difference value between a forced delay and time information of the peer is inferred.

2. The operation method of claim 1, wherein if the peer has just been initiated and there is no the BTT of the corresponding peer, the initial SP value is determined using an equation 1, $$SP = \text{peer}DP - \text{ROUND}[\frac{1}{2} \times \max[(\text{peer}DP - \text{peer}SP), 1]] \quad \text{[Equation 1]}$$

wherein SP indicates the initial SP value, peerDP indicates a downloading point of the corresponding peer, and peerSP indicates a starting point of the corresponding peer.

3. The operation method of claim 1, wherein the forced delay is selected by a service provider or the peer.

4. The operation method of claim 1, further comprises:
transmitting a HELLO message to the corresponding peer; and
receiving a HELLO message including the BTT from the corresponding peer.

5. The operation method of claim 4, wherein the HELLO message corresponds to a message used by the peer to establish a neighbourship with the corresponding peer.

6. The operation method of claim 1, further comprises:
transmitting a GETBTT message to the corresponding peer; and
receiving the BTT from the corresponding peer.

7. The operation method of claim 6, wherein the GETBTT message corresponds to a message used by the peer to request the BTT from the corresponding peer.

8. A peer comprising:
a communication interface; and
a processor configured to:
contact with a corresponding peer by using the communication interface; and
determine an initial starting point (SP) value of the peer if the peer has buffermap timetable (BTT) of the corresponding peer, the SP indicating an identifier at beginning of a buffermap of the peer,
wherein the initial SP value is chosen by using an average of time deviations of the fragmentation time included in the BTT, and
wherein a fragment number corresponding to a difference value between a forced delay and time information of the peer is inferred.

9. The peer of claim 8, wherein if the peer has just been initiated and there is no the BTT of the corresponding peer, the initial SP value is determined using an equation 2, $$SP = peerDP - \text{ROUND}[½ \times \max[(peerDP - peerSP), 1]] \quad \text{[Equation 2]}$$

wherein SP indicates the initial SP value, peerDP indicates a downloading point of the corresponding peer, and peerSP indicates a starting point of the corresponding peer.

10. The peer of claim 8, wherein the forced delay is selected by a service provider or the peer.

11. The peer of claim 8, wherein the processor is further configured to transmit a HELLO message to the corresponding peer by using the communication interface, and receive, from the corresponding peer, a HELLO message including the BTT by using the communication interface.

12. The peer of claim 11, wherein the HELLO message corresponds to a message used by the peer to establish a neighbourship with the corresponding peer.

13. The peer of claim 8, wherein the processor is further configured to transmit a GETBTT message to the corresponding peer by using the communication interface, and receive the BTT from the corresponding peer by using the communication interface.

14. The peer of claim 13, wherein the GETBTT message corresponds to a message used by the peer to request the BTT from the corresponding peer.

* * * * *